United States Patent Office 3,302,064
Patented Jan. 31, 1967

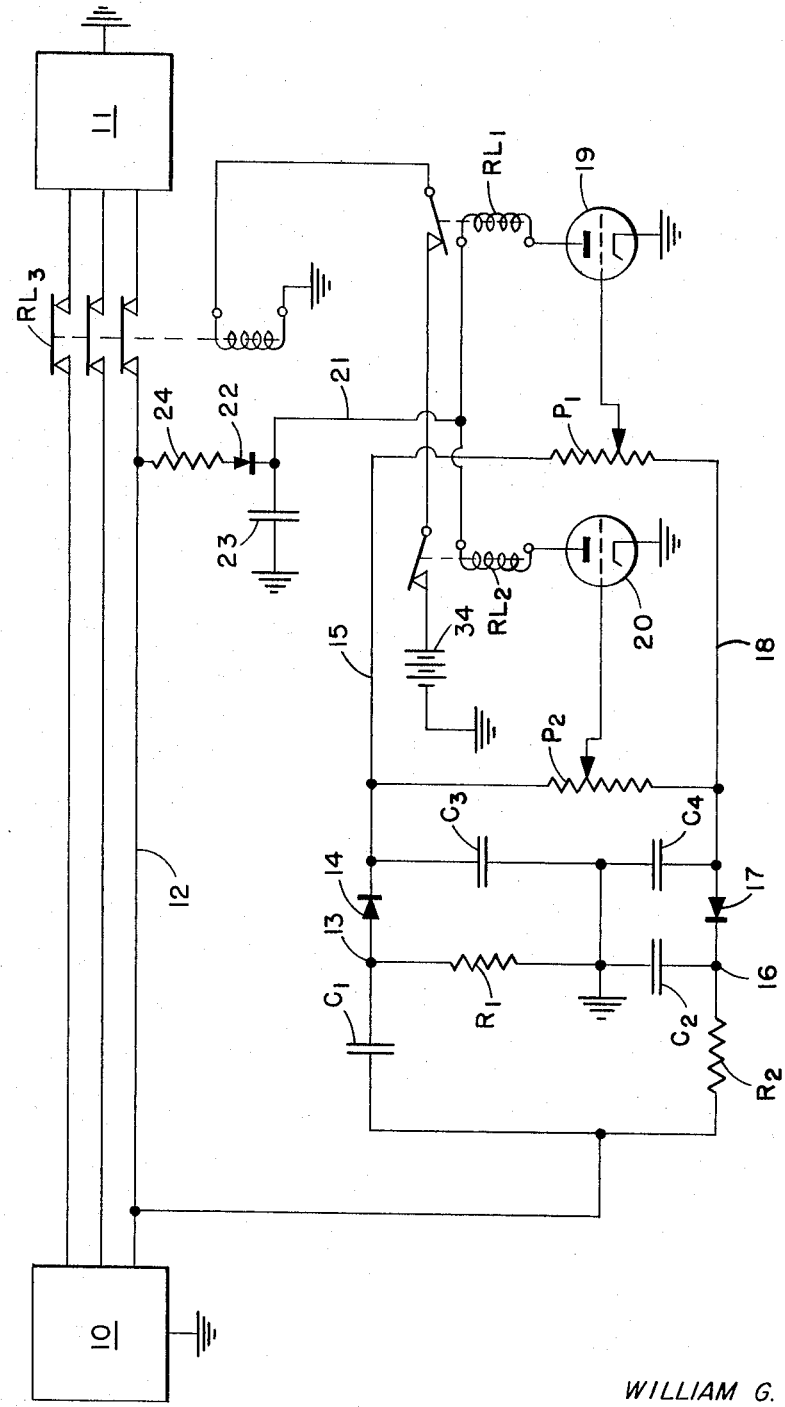

3,302,064
VOLTAGE INSENSITIVE FREQUENCY MONITORING SYSTEM
William G. Redmond, Arlington, Tex., assignor to Ling-Temco-Vought, Inc., Dallas, Tex., a corporation of Delaware
Filed Apr. 29, 1963, Ser. No. 276,399
15 Claims. (Cl. 317—51)

This invention relates to electrical protective devices and more particularly to a system for monitoring the frequency of an A.-C. power source.

As is well known in the art, many electrical and electronic systems, etc. are readily damaged by either an excessive increase or decrease of the frequency or a related A.-C. power source relative to a nominally correct frequency value. Among frequency monitoring devices previously employed, those of relatively good accuracy at even a constant voltage amplitude of the power source have tended to be of complex circuitry involving many components and hence have tended to be of undesirably high cost. While in some installations the bulk and weight of a frequency monitoring system occasioned by the use of a large number of components are of little concern, in many other cases (notably in aircraft applications, etc.) bulk and weight are of prime importance. Reliability of a frequency monitoring system, always of importance and in aircraft of vital concern, tends to decrease with an increase in the number of parts in the system; hence, high reliability has not been compatible with high accuracy. In this connection, one of the most serious shortcomings of previous devices of this nature has been their susceptibility to error accompanying even a small change in voltage amplitude of the A.-C. power source. Where these devices produce an output indicative of or responsive to frequency of the power source, a shift in power source voltage amplitude results in a spurious indication of or response to frequency error even though frequency has not actually deviated from a correct value; consequently, frequency monitoring devices have been adequately accurate only while operating within a relatively narrow range of input voltage amplitude from the power source.

It is, accordingly, a major object of the present invention to provide a frequency monitoring system of excellent accuracy and concurrently of desirably small cost, bulk, and weight and of high simplicity of circuit construction. A further important object is to provide a frequency monitoring system substantially insensitive, as regards its accuracy, to even large changes in voltage amplitude of the associated power source.

Other objects and advantages will be apparent from the specification and claims and from the accompanying drawing illustrative of an embodiment of the invention.

The single figure of the drawing represents schematically the circuit of a preferred embodiment of the invention, movable components thereof being shown in their respective positions occupied when the power source is operating at a normal frequency.

In the drawing, the source 10 produces single-phase or multiphase A.-C. power which is supplied to a load 11 through the contacts of a main power control relay RL$_3$, which contacts are normally open and are closeable, upon energization of the relay winding, for connecting the power source 10 to the load 11.

Frequency-sensitive means are provided for producing a positive and negative pair of D.-C. output voltages proportional to frequency of the power source 10. A first circuit produces a D.-C. output voltage proportional to power source frequency. (As the term "proportional" is employed herein, it refers to the case where variations in a first quantity are of the same sign as corresponding changes in a second quantity to which the first is proportional; where corresponding changes are of opposite sign, the term "inversely proportional" is employed. Furthermore, the term "proportional" does not necessarily refer only to the case of quantities having exactly the same or a constant ratio, but as well to cases in which, substantially and for practical purposes, the ratio between two quantities remains the same.) The first circuit comprises a first frequency-sensitive network including, for example, a capacitor $C_1$ and a resistor $R_1$ serially connected, in the order mentioned, between a given lead 12 of the power source and ground, the latter term being consistently used herein to designate a common ground. This network produces a first A.-C. voltage output, taken from an output terminal 13 located between the capacitor $C_1$ and resistor $R_1$, which is proportional to the frequency of the power source 10. The first circuit further comprises means rectifying and smoothing the first A.-C. output to produce therefrom a positive D.-C. voltage, this last-named means including a first rectifier 14 connecting a first lead 15 to the first network output terminal 13 and a first smoothing capacitor $C_3$ connected between the first lead 15 and ground. Since the rectifier 14 is oriented to conduct positive pulses from the first network onto the first lead 15, the latter carries a positive D.-C. voltage proportional to frequency of the power source 10 within a frequency range of reasonable breadth which includes the frequency range within which the output of the power source is expected to be used by the protected load 11 without damage to the latter.

The second circuit, the output of which is a negative D.-C. voltage which varies in inverse proportion to frequency of the A.-C. power source, comprises a second frequency-sensitive network including a resistor $R_2$ and a capacitor $C_2$ serially connected in the order stated between the given lead 12 of the power source and ground. The output of the second network is an A.-C. signal taken from an output terminal 16 located between the resistor $R_2$ and capacitor $C_2$ and varying in voltage amplitude in inverse proportion to frequency of the A.-C. power source 10. Further comprised by the second circuit is means for rectifying and smoothing the second A.-C. output signal to produce a negative output voltage the magnitude of which is inversely proportional to frequency of the power source 10. The last-named rectifying and smoothing means comprises a second rectifier 17 connecting a second lead 18 to the output terminal 16 between resistor $R_2$ and capacitor $C_2$ and a smoothing capacitor $C_4$ connected between the second lead 18 and ground. The second rectifier 17 is oriented in such manner that only the negative pulses of the second A.-C. output signal passes onto the second lead 18; smoothed by the second capacitor $C_4$, these pulses form a negative voltage of magnitude inversely proportional, within a reasonable range as stated above, to frequency of the power source 10.

Since the capacitor $C_1$ and resistor $R_1$ of the first network and the resistor $R_2$ and capacitor $C_2$ of the second network are linear circuit elements, the positive and negative output voltages, provided respectively on the first and second leads 15, 18, are not only related as described to the frequency of the power source 10 but in addition are directly proportional to the power source voltage amplitude. It will be evident that other frequency-sensitive means than the specific means described may be employed as long as the means selected provides a positive and a negative voltage related to frequency of the power source as described. The specific circuit set forth is preferred because of its excellent simplicity and high reliability, and although its outputs are affected by the voltage amplitude of the power source 10, it will be seen that other features of the invention make this of virtually no consequence whatsoever to accuracy of the entire system.

Before entering upon discussion of the details of the remaining components of the system, it should be mentioned that the total impedance of the remainder of the system components which are in circuit with the above-described frequency-sensitive means should be high (for example, six to ten or more times higher than) the impedance of the frequency-sensitive means to the end that the latter will not be overloaded during operation and will be able to produce an adequate output.

For simultaneous over- and under-frequency monitoring of the A.-C. power source, the system employs a pair of voltage-responsive current-control means 19, 20 each having a control electrode (e.g., a grid) and first and second electrodes (e.g., a plate and cathode) between which current flows when the current-control means conducts, current flow being from the first to the second electrode. The voltage-responsive current-control means may comprise one or a pair of transistors, although some transistors (and some electronic tubes) will not operate, as will a triode electronic tube, to cancel, when employed as described below, the effects of deviations in value of the signals on the first and second leads 15, 18 occasioned by deviations in voltage amplitude of the power source 10. In the specific example, the current-control means comprises a pair of triode electronic tubes 19, 20 each having a plate, a grid, and a grounded cathode; in practice, the 7889 tube has yielded excellent results.

A plurality of current-responsive means, for example, a pair of relays $RL_1$ and $RL_2$, are provided, each with a winding having one end connected to the first electrode of a respective current-control means 19 or 20. The contacts of the first relay $RL_1$ are normally closed (i.e., closed when the relay $RL_1$ is de-energized), and the contacts of relay $RL_2$ are normally open. The winding of each relay $RL_1$ and $RL_2$ is connected between a third lead 21 and the plate of a respective triode 19 or 20; a representative value of the resistance of the winding is 10,000 ohms.

Means are employed to maintain an E.M.F. between the first and second electrodes (plate and cathode) of each triode 19, 20 and in the preferred example comprise a plate power supply rectifier 22 connected between the third lead 21 and the given lead 12 of the power source and oriented to conduct positive pulses onto the third lead 21. A smoothing capacitor 23 is connected between the third lead 21 and ground to produce on the third lead 21 a D.-C. voltage which is proportional to voltage amplitude of the power source 10 and which is supplied to the first electrode of each current-control means 19 or 20 through the winding of a respective relay $RL_1$ or $RL_2$. To prevent possibly excessive current surges, a surge resistor 24 of value high enough to supply the needed protection but low enough to supply adequate plate current preferably is employed between the A.-C. power source lead 12 and the plate power supply rectifier 22.

To supply first and second D.-C. control signals to the control electrodes of each current-control means 19 or 20, there are employed summing means in form of a pair of potentiometers $P_1$, $P_2$. Each potentiometer $P_1$, $P_2$ sums the positive and negative outputs of the first and second leads 15, 18 between which the resistance elements of the potentiometers are connected, the wiper of each potentiometer being connected to the grid of a respective triode 19 or 20. Since it sums the positive and negative outputs of the frequency-sensitive means, each potentiometer $P_1$, $P_2$ produces and supplies to the grid of a respective triode 19 or 20 a D.-C. control voltage the magnitude of which is proportional to frequency of the power source 10. The wiper of each potentiometer $P_1$, $P_2$ is adjusted to produce a control signal voltage of value sufficient (i.e., sufficiently large or sufficiently small, as the case may be) to regulate current flow through the respective, associated current-control device 19 or 20 to a value yielding a desired state of energization of the corresponding current-responsive means $RL_1$ or $RL_2$.

A control power source 34 is connected through the serially connected contacts of relays $RL_1$ and $RL_2$, when the contacts of both these relays are closed, to the winding of the main power control relay $RL_3$, the other end of which winding is grounded; thus energized, the main power control relay $RL_3$ closes its contacts to connect the A.-C. power source 10 to the load 11.

The values of capacitors $C_1$, $C_2$ and resistors $R_1$, $R_2$ are chosen so that the values of the positive and negative outputs on the first and second leads 15, 18 are symmetrical on each side of zero at a frequency lying in the region of the nominally correct operating frequency of the A.-C. power source. In a representative application for a 400-cycle power source, this frequency was 380 c.p.s. The wipers of potentiometers $P_1$, $P_2$ are adjusted to locations at which, during operation of the A.-C. power source 10 within a range of frequencies accepted as normal, the control voltage supplied to the first current-control device 19 by potentiometer $P_1$ is of a value preventing the latter from conducting, while the value of the signal supplied by the second potentiometer $P_2$ allows conducting of the second current-control device 20; hence, the contacts of both current-responsive means $RL_1$, $RL_2$ are closed and the main power control relay $RL_3$ is energized to close its contacts and connect the A.-C. power source 10 to the load 11.

Whereas each potentiometer $P_1$, $P_2$ sums the rectified and smoothed outputs of the two frequency-sensitive networks $C_1$, $R_1$ and $R_2$, $C_2$ and supplies a D.-C. control signal in accordance therewith, each current-control means 19, 20 receives on its control electrode (for example, its grid) a respective one of the control volages thus derived and compares the received control voltage with the voltage of its second electrode (for example, a grounded cathode). Whether or not the current-control means 19 or 20 conducts sufficiently to close or to maintain closed its associated relay $RL_1$ or $RL_2$ depends on the results of this comparison. The setting of the wiper of the first potentiometer $P_1$ is such that if the power source frequency rises to a preselected, maximum tolerable value (for example, to about 430 c.p.s where the nominally correct frequency is 400 c.p.s), the accompanying increase in positive value of the signal on the first lead 15 and decrease in negative value of the signal on the second lead 18 raise the voltage of the output of potentiometer $P_1$, hence the grid voltage of the first current control means 19, to a value at which the first current-control means 19 conducts and energizes the winding of relay $RL_1$ sufficiently to pull open its normally closed contacts. With its winding thus disconnected from the control power source 24, the main power control relay $RL_3$ opens and disconnects the load 11 from the power source 10.

On the other hand, the setting of the wiper of the second potentiometer $P_2$ is such that, if the power source frequency falls to a preselected, minimum tolerable value (for example, to about 370 c.p.s. where the nominally correct frequency is 400 c.p.s.), the accompanying decrease in value of the positive signal on lead 15 and increase in negative value of the other signal on lead 18 lower the voltage of the output of potentiometer $P_2$ to a value at which the second current-control device 20 can no longer conduct a current sufficient to hold the normally open contacts of the second relay $RL_2$ closed. As a consequence, relay $RL_2$ opens, the main power control relay $RL_3$ is de-energized, and the load 11 is disconnected from the A.-C. power source 10.

As mentioned above, previous frequency monitoring devices have been excessively subject to error because the output or outputs of their frequency-sensitive means are proportional to voltage amplitude of the associated power source. The outputs of the frequency-sensitive means of the present system, received on the first and second leads 15, 18 and summed by the first and second potentiometers $P_1$, $P_2$, also are proportional to the voltage amplitude of the power source 10. However, by employing current-control means 19, 20 in the form of triode electronic tubes wherein the control voltage value required for effecting a plate current value resulting in pick-up of relay $RL_1$ or for drop-out of relay $RL_2$ for de-energization of the main power control relay $RL_3$ is negative, proportionality of the control voltages to power source voltage amplitude is, by virtue of the operation of remaining elements of the system, of virtually no effect whatever on accuracy. This importantly advantageous result tems from plate power supply employed in which the positive voltage on the third lead 21 is proportional to voltage amplitude of the A.-C. power source 10 and from the characteristic operation of a triode electronic tube (or equivalent) 19, 20 in which, in the region of relatively low plate current, the grid voltage magnitude required to supply a given plate current is very nearly proportional to the plate supply voltage. In the present system, both the grid voltage magnitude and plate supply voltage vary in proportion to the power source voltage amplitude. Thus, an increase in power source voltage amplitude results in an increased (more positive) plate supply voltage which tends to increase the plate current of the triode 19 or 20 but at the same time results in a greater-magnitude (more negative) grid voltage which by a virtually equivalent amount tends to decrease the plate current which therefore remains essentially the same frequency having remained constant as if the power source voltage increase had not occurred. In the same manner a decrease in power source voltage results in a decreased plate supply voltage which to all practical purposes entirely eliminates the effect of the accompanying change in grid voltage magnitude at either triode. Whereas prior frequency-monitoring systems are of adequate accuracy only within a power source voltage range of a few volts the present system is excellently accurate over ranges of power source voltage much wider than need ordinarliy be considered in practice. For example, there will be considered the extreme case where a 400-cycle power source changes by well over 50% from its correct voltage of 115 volts and drops to only 50 volts.

With an A.-C. voltage of 115 volts R.M.S. on the power source lead 12, the plate supply voltage, as measured at lead 31, is about plus 150 volts D.-C. The drop-out current for a typical relay useable as the second relay $RL_2$ is 0.5 ma.; from the characteristics curves of the representative 7889 tube, the grid voltage necessary to limit the plate current of the second current-control device 20 to 0.5 ma., when the plate supply voltage on lead 21 is plus 150 volts and the relay winding is of 10,000 ohms resistance, is minus 2.09 volts. The wiper of the second potentiometer $P_2$ is, for example, adjusted to cause this grid voltage to occur at 368.0 c.p.s.

Upon drop of the power source 10 from 115 volts to 50 volts R.M.S. a voltage change of well over 50%, the plate supply voltage on the third lead 21 drops correspondingly to approximately plus 71 volts. Again according to the characteristics curves of the representative triode, and at this drastically lowered plate voltage, the grid voltage at the second current-control means 20 must be minus 0.88 volt to yield the necessary limitation of the plate current through relay $RL_2$ to 0.5 ma. But the input voltage from the power source 10 to the frequency-sensitive networks $C_1$, $R_1$ and $R_2$, $C_1$ has also dropped in proportion to the plate supply voltage; therefore, their outputs, as evidenced on the first and second leads 15, 18 and ultimately on the wiper of potentiometer $P_2$, also have dropped in the same proportion; the grid voltage of triode 20 is minus 0.88 volt at 368 c.p.s. Thus, the drop-out frequency, in spite of an A.-C. power source voltage change of well over 50%, has shifted only 0.4 c.p.s A similar operation occurs when the A.-C. power source rises even drastically above its correct voltage. It thus is evident that a given current is delivered to either relay $RL_1$ or $RL_2$ at virtually the same frequency even when power source voltage change widely and that the accuracy of the frequency monitoring system, for all practical purposes, is entirely unaffected by an insensitive to voltage changes in the A.-C. power source 10.

Whereas the system has been described as employed for monitoring both under- and over-frequencies in the power supply, it will be evident that a system for monitoring under-frequency only is provided when the first potentiometer $P_1$, first current-control means 19, and a first relay $RL_1$ are omitted; through the contacts of the second relay $RL_1$ are shown as connected to the winding of the main power control relay $RL_3$ through the contacts of the first relay $RL_1$, provision of an unbroken conductor in the place of the latter would ordinarily be made. Similarly, for over-frequency monitoring alone, the connection of the contacts of the first relay $RL_1$ to the control power source 34, shown as effected through the contacts of the second relay $RL_2$, is best made through an unbroken conductor, and the second potentiometer $P_2$, second current-control means 20, and second relay $RL_2$ are removed.

While only one embodiment of the frequency-monitoring device has been described herein and shown in the accompanying drawing, it will be evident that further modifications may be made in the components and construction of the system without departing from the scope of the invention.

I claim:
1. For monitoring the frequency of an A.C. power source, a system comprising:
    frequency-sensitive means connected to the A.C. power source and producing a positive and negative pair of D.C. voltage outputs proportional to the frequency of the power source;
    voltage-responsive current-control means having a control electrode and first and second electrodes between which electrical current flows when the current-control means conducts, current flow being from the first to the second electrode;
    current-responsive means;
    means connecting said current-responsive means to said power source and to said first electrode to maintain an E.M.F. between the first and second electrode;
    and summing means summing the positive the negative D.C. voltage outputs and yielding therefrom a control signal voltage proportional to frequency of the power source and, at a predetermined frequency, of value sufficient for regulating current flow through the current-control device to a value yielding a desired state of energization of the current-responsive means, the summing means being connected to the control electrode of the current-control device for supply of the control signal thereto.

2. The system of claim 1, the frequency-sensitive means comprising a first circuit the output voltage of which varies in proportion to frequency of the power source and a second circuit the output voltage of which varies in inverse proportion to frequency of the A.C. power source.

3. The system of claim 1, the frequency-sensitive means comprising:
    a first network connected between a given lead of the power source and ground and producing a first A.-C. output of voltage amplitude proportional to the frequency of the A.-C. power source;
    a second network connected between the given lead of the power source and ground and producing a second A.-C. output of voltage amplitude inversely proportional to the frequency of the A.-C. power source;
    and means rectifying and smoothing the first and second A.-C. outputs to produce said positive and negative pair of D.-C. voltage outputs.

4. The system of claim 1, the summing means comprising a potentiometer having a resistance element with two ends respectively receiving the positive D.-C. voltage output and the negative D.-C. voltage output and a wiper connected to the current-control means control electrode.

5. For monitoring the frequency of an A.-C. power source, a system comprising:
   frequency-sensitive means connected to the A.-C. power source and producing a positive and negative pair of D.-C. voltage outputs proportional to the frequency of the power source;
   a plurality of voltage-responsive current-control means each having a control electrode and first and second electrodes between which electrical current flows when the current-control means conducts, current flow being from the first to the second electrode;
   a plurality of current-responsive means;
   means connecting said current-responsive means to said power source and to the first electrode of each of said current control means to maintain an E.M.F. between the first and second electrodes of each of the current-control means;
   and a plurality of summing means each summing said positive and negative outputs and yielding therefrom a respective control signal voltage proportional to frequency of the power source and, at a respective, predetermined frequency, of value sufficient for regulating current flow through a respective one of the current-control means to a value yielding a desired state of energization of a corresponding one of the current-responsive means, each of said summing means control signals being supplied to the control electrode of a respective one of the current-control means.

6. For monitoring the frequency of A.-C. power source, a system comprising:
   frequency-sensitive means connected to the power source and producing a positive and negative pair of voltage outputs proportional to the frequency and the voltage amplitude of the power source;
   a triode electronic tube having a plate, a grid, and a cathode which is connected to ground;
   plate supply producing means connected to the A.-C. power source and producing a positive D.-C. plate voltage proportional to voltage amplitude of the A.-C. power source;
   current-responsive means connected between the plate supply producing means and the plate to supply to the latter the plate voltage;
   and summing means summing the positive and negative outputs and yielding therefrom, at a preselected frequency of the power source, a control signal voltage of negative value sufficient for regulating current flow through the triode to a value yielding a desired state of energization of the current-responsive means, the control signal voltage being supplied to the grid.

7. The system of claim 6, the frequency-sensitive means comprising a first circuit the output voltage of which varies in direct proportion to frequency of the power source and a second circuit the output voltage of which varies in inverse proportion to frequency of the A.-C. power source.

8. The system of claim 6, the frequency-sensitive means comprising:
   a first network connected between a given lead of the power source and ground and producing a first A.-C. output of voltage amplitude proportional to the frequency of the A.-C. power source;
   a second network connected between the given lead of the power source and ground and producing a second A.-C. output of voltage amplitude inversely proportional to the frequency of the A.-C. power source;
   and means rectifying and smoothing the first and second A.-C. outputs to produce said positive and negative pair of D.-C. voltage outputs.

9. The system of claim 6, the summing means comprising a potentiometer having a resistance element with two ends respectively receiving the positive D.-C. voltage output and the negative D.-C. voltage output and a wiper connected to the current-control means control electrode.

10. The system of claim 6, the current-responsive means being a relay with a winding connected between the plate supply producing means and the plate to supply to the latter the plate voltage and with a pair of normally open contacts.

11. The system of claim 10, said system further comprising:
   a control power source connected to one of said normally open contacts;
   a load;
   and a main power control relay with normally open contacts closeable for connecting the load to the A.-C. power source and with a winding connected between ground and the other of said normally open contacts of the current-responsive means.

12. The system of claim 6, the current-responsive means being a relay with a winding connected between the plate supply producing means and the plate to supply to the latter the plate voltage and with a pair of normally closed contacts.

13. The system of claim 12, said system further comprising:
   a control power source connected to one of said normally closed contacts;
   a load;
   and a main power control relay with normally open contacts closeable for connecting the load to the A.-C. power source and with a winding connected between ground and the other of said normally closed contacts.

14. For monitoring an A.-C. power source for over- and under-frequency, a system comprising:
   frequency-sensitive means connected to the power source and producing a positive and negative pair of voltage outputs proportional to the frequency and the voltage amplitude of the power source;
   first and second triode electronic tubes each having a plate, a grid, and a cathode which is connected to ground;
   plate supply producing means connected to the A.-C. power source and producing a positive D.-C. plate voltage proportional to voltage amplitude of the A.-C. power source;
   first and second current-responsive means each connected between the plate of a respective one of the first and second triodes to each provide the plate supply voltage to a respective one of said plates;
   and first and second summing means each summing the positive and negative outputs and each yielding therefrom, at a respective, preselected frequency of the power source, a control signal voltage of negative value sufficient for regulating current flow through a respective, associated one of the triodes to a value yielding a desired state of energization of the associated current-responsive means, each of said control signal voltages being supplied to the grid of a respective one of the triodes.

15. For monitoring an A.-C. power supply for over- and under-frequency, a system comprising:
   a first frequency-sensitive network comprising a capacitor and a resistor serially connected in the order stated between the A.-C. power source and ground and having an output terminal between the capacitor and resistor;
   a second frequency-sensitive network comprising a resistor and a capacitor serially connected in the order stated between the A.-C. power source and ground and having an output terminal between the resistor and capacitor;
   a first lead;
   a first rectifier connecting the first lead to the first network output terminal and oriented to conduct positive pulses onto the first lead from the first network;
   a second lead;

a second rectifier connecting the second lead to the second network output terminal and oriented to conduct negative pulses onto the second lead from the second network;

first and second smoothing capacitors respectively connected between the first and second leads and ground;

first and second triode electronic tubes each having a grid, a cathode which is connected to ground, and a plate;

a third lead;

a plate power supply rectifier connected between the third lead and the A.-C. power source and oriented to conduct positive pulses onto the third lead;

a smoothing capacitor connected between the third lead and ground;

a first relay having a winding connected between the third lead and the first triode plate and having a normally closed pair of contacts;

a second relay having a winding connected between the third lead and the second triode plate and having a normally open pair of contacts;

a load;

a main power control relay having a winding and normally open contacts closeable for connecting the A.-C. power source to the load;

a control power source connected to one of the contacts of the second relay, the other second relay contact being connected to one of the first relay contacts and the main power control relay being connected between the other of the first relay contacts and ground;

a first potentiometer having a resistance element connected between the first and second leads and a wiper connected to the grid of the first triode and adjusted to a position along the first potentiometer resistance element in which the first triode grid voltage is of a negative value sufficiently small, at a predetermined over-frequency of the A.-C. power source, to produce a current flow through the second triode of a value producing pick-up of the first relay;

and a second potentiometer having a resistance element connected between the first and second leads and a wiper connected to the grid of the second triode and adjusted to a position along the resistance element in which the second triode grid voltage is of a negative value sufficiently large, at a predetermined under-frequency of the A.-C. power source, to reduce current flow through the second triode to a value allowing drop-out of the second relay.

References Cited by the Examiner

UNITED STATES PATENTS

| | | |
|---|---|---|
| 2,398,419 | 4/1946 | Finison. |
| 2,699,499 | 1/1955 | Jordan _____ 317—147 X |
| 3,068,420 | 12/1962 | Smith. |
| 3,243,658 | 3/1966 | Blackburn _____ 317—50 X |

MILTON O. HIRSHFIELD, *Primary Examiner,*

R. V. LUPO, *Assistant Examiner,*